United States Patent [19]

Buckfelder et al.

[11] Patent Number: 4,601,827

[45] Date of Patent: Jul. 22, 1986

[54] MULTISTAGE ANNEALING OF ARAMIDE REVERSE OSMOSIS MEMBRANES

[75] Inventors: John J. Buckfelder, Wilmington, Del.; Henry M. Schleinitz, Kennett Square, Pa.

[73] Assignee: E. I. Du Pont de Nemours and Company, Wilmington, Del.

[21] Appl. No.: 655,085

[22] Filed: Sep. 27, 1984

[51] Int. Cl.$^4$ .......................... C08J 9/28; B29C 71/02
[52] U.S. Cl. ................................ 210/500.33; 264/41; 264/235; 264/346; 210/500.38
[58] Field of Search ...................... 264/41, 235, 346; 210/500.2

[56] References Cited

U.S. PATENT DOCUMENTS

| | | | |
|---|---|---|---|
| 3,567,632 | 3/1971 | Richter et al. | 210/23 |
| 3,718,722 | 2/1973 | Lee | 264/346 X |
| 3,822,202 | 7/1974 | Hoehn | 210/23 |
| 3,878,109 | 4/1975 | Ikeda et al. | 210/500 M |
| 4,086,215 | 4/1978 | Kurihara et al. | 210/23 H |

Primary Examiner—Philip Anderson

[57] ABSTRACT

A process for forming a reverse osmosis membrane is disclosed. The process involves casting a solution of an aromatic polyamide and a modifying salt to form a layer which is dried and quenched with water to gel the aromatic polyamide, and annealed in water at 40°–110° C. and preferably 40° to 90° in a plurality of stages with the final stage being at more than 60° C.

11 Claims, No Drawings

MULTISTAGE ANNEALING OF ARAMIDE REVERSE OSMOSIS MEMBRANES

BACKGROUND OF THE INVENTION

1. Field of the Invention

The present invention relates to a process for annealing aromatic polyamide reverse osmosis membranes after such membranes have been cast, dried and quenched.

2. Prior Art

U.S. Pat. No. 3,822,202 discloses heat treatment of gas separation membranes to improve selectivity.

U.S. Pat. No. 4,086,215 discloses heat treatment of reverse osmosis membranes to improve their salt rejection.

U.S. Pat. No. 3,878,109 discloses heat treatment of reverse osmosis membranes to improve the permselectivity thereof.

U.S. Pat. No. 3,567,632 discloses aramide reverse osmosis membranes.

SUMMARY OF THE INVENTION

The present invention relates to a process for improving the permeability of aramide reverse osmosis membranes by annealing such membranes in a plurality of stages.

DETAILED DESCRIPTION

The reverse osmosis membranes of the present invention are prepared by casting a solution of an aromatic polyamide to form a layer on a support, evaporating some of the solvent from the surface of the resulting layer of aromatic polyamide solution and then quenching with water. The casting step can be casting the solution onto a casting surface, or a support fabric.

The casting solution generally will contain 10 to 30 wt. % aromatic polyamide and preferably 15 to 20 wt. % aromatic polyamide. The casting solution also contains a modifying salt. Suitable modifying salts include lithium nitrate, lithium chloride, hydrated magnesium chloride and mixtures thereof. The modifying salt should be present in an amount of from 20-60 wt. %, based on the aromatic polyamide.

The solvent used to form the casting solution is a polar organic solvent. Suitable polar organic solvents include dimethylacetamide, dimethylformamide, dimethylsulfoxide and N-methylpyrrolidione; of these dimethylacetamide is preferred.

The aromatic polyamides which can be used in the present invention can be, for example, those nitrogen-containing polymers described in Richter et al. U.S. Pat. No. 3,567,632, which is hereby incorporated by reference. Of the polymers disclosed in this patent, those having a sulfur content of 0 to 4.5 wt. % are suitable for use herein with a sulfur content of 1.5 to 3.8 wt. % being preferred. The sulfur is present as sulfonic acid groups. The polymers are derived from meta-phenylenediamine, and optionally meta-phenylenediamine-4-sulfonic acid and isophthalyl and terephthalyl chlorides wherein the ratio of isophthalyl chloride to terephthalyl chloride is from about 50:50 to 80:20.

The critical aspect of the present invention is in annealing the membrane in water in two or more stages and preferably 2 or 3 stages.

The temperature range for annealing is 40° to 110° C. in stages lower to higher. A range of 40° to 90° C. is preferred. Generally the final annealing temperature will be above 60° C. A particularly preferred range for the final annealing step of 68°–85° C. The time of annealing in the earlier stages is not critical and can vary from 5 seconds to several hours. Generally the time of the final annealing stage will be from 5 seconds to twenty minutes. The preferred time for the final annealing step is from 30 seconds to ten minutes.

The process of the present invention provides reverse osmosis membranes which have high salt rejection comparable to membranes which have been annealed in a single stage but which have improved stability with respect to permeability over an extended period of time as compared with membranes which have been annealed in a single stage.

Generally, the aromatic polyamide solution is cast or extruded at from 0° to 125° C. and preferably 15° to 35° C. The range of 15° to 35° C. represents ambient temperature and is preferred because of simplicity. The pre-membrane as extruded generally will have a thickness of from 1 to 10 mils, ($2.5 \times 10^{-5}$ m–$2.5 \times 10^{-4}$ m). After being cast or extruded the pre-membrane is partially dried. The drying is done at 50° to 170° C. with from 80° to 150° C. being preferred. The drying should be done to the extent necessary to leave from 30 to 50 wt. % aromatic polyamide in the pre-membrane.

After the partial drying step, the pre-membrane is quenched with water. It is preferred that the quench be done within 10 seconds and most preferably 5 seconds after the pre-membrane leaves the drying oven. The quench water should be at from 0° to 30° C. and preferably 10° to 25° C. Generally, the quenching step will last one or two minutes. While longer quench times can be used they offer no improvement over the quench effect obtained after a few minutes. In fact the membrane is normally stored in water at ambient temperature. The quench step serves to gel the polymer and freeze in its structure as well as to extract residual solvent and modifying salt. The membranes of the present invention are from 1 to 10 mils ($2.54 \times 10^{-5}$ m–$2.54 \times 10^{-4}$ m) in thickness and have average densities of from 0.15 to 0.40 g/cc.

The membranes of the present invention are anisotropic. That is they are denser on the side from which the solvent has been evaporated during their preparation. This anisotropic nature can be determined using a scanning electron microscope or a transmission electron microscope.

The membranes of the present invention generally are flat films, but also can be tubular in nature. Tubular membranes are formed by casting the aromatic dope on a preformed tubular support followed by performing the remaining process steps disclosed herein.

EXAMPLES

The permeability properties reported in the Examples were determined with a 0.2±0.01 wt% sodium chloride solution in magnetically stirred permeation cells at the pressures reported at ambient temperatures. The concentration of NaCl in the feed, $C_f$, and in the permeate, $C_p$, were calculated from measured solution resistivities. The NaCl rejection, expressed as percent is $$\text{Rejection} = (1 - C_p/C_f) \times 100$$

The flux constant, kw, was calculated as the permeate flow rate per unit area divided by the net effective pressure, i.e. the net gauge pressure less the net osmotic pressure, $\Delta P - \Delta \pi$.

$$kw = \frac{\text{Volume}}{\text{time} \times \text{area} \times (\Delta P - \Delta \pi)}$$

expressed as cubic meters of water permeated per square meter of membrane per second per unit of effective pressure in Tera Pascal ($10^{12}$ Pascals) or m/s.TPa. Flux constants were normalized to 25° C. by the ratio of the viscosity of water at the test temperature[1] to the viscosity at 25° C.

[1] J. F. Swindells, Nat'l. Bur. of Stand., in Handbook of Chemistry and Physics, 61st ed. CRC Press, pF51.

Membrane stability as reported in the Examples was assessed in stirred cells under isobaric and near isothermal conditions in tests of 120 to more than 500 hours. The temperature corrected flux constant kw (t) and the salt rejection are calculated for each recorded elapsed time. The best least squares fit of $$\log_{10}(kw(t)) = \log_{10}(kw(1)) + fd \log_{10}(t)$$

is obtained from one hour to any intermediate time(s) and to the total test time
where
t = elapsed time in hours
kw(1) = flux constant at 1 hour
kw(t) = flux constant at t hours
fd = flux decline slope The value used for kw(1) is that extrapolated from the best fit to all data points, it may be 5 or 6% higher than the flux constant actually recorded after one hour's operation. The flux decline slope, fd, is determined from the equation:

$$fd = \frac{\log_{10}(kw(t)) - \log_{10}(kw(1))}{\log_{10}(t)}$$

Experience in well run reverse osmosis plants indicates that the flux decline slope is a constant over a period of several years. Therefore the Membrane Flux Retention Coefficient in percent for 3 years can be calculated as follows:

$$MFRC3 = 100 \times \frac{kw(3 \text{ years})}{kw(1 \text{ hour})} = 100 \times (t_{3 \text{ years}})^{fd}$$

(%) $t_{3 \text{ years}}$ = 26280 hours.

EXAMPLE 1

A primary membrane was prepared by coating a solution consisting of 17.4 wt. % of a polyaramide derived from isophthalyl chloride and terephthalyl chloride (in a mole raito of 70/30) and m-phenylene diamine and m-phenylenediamine-4-sulfonic acid (in a mole ratio of 72/28) and 50.9 wt. % (based on polyamide) LiNO$_3$ in dimethylacetamide with a viscosity of 190 poise onto scoured and calendered sailcloth (Texlon ®0715) to a thickness of 7 mils ($1.78 \times 10^{-4}$ m). The polyaramide coating was dried for 2 minutes in a recirculating air dryer at 245° F. (118° C.). Five seconds after removal from the dryer the polyaramide was gelled with a deluge of water containing about 4 wt. % dimethylacetamide at 20° C. The membrane was extracted successively at 20°, 17° and 20° C. for approximately 20 seconds, 43 seconds and 3 seconds respectively in three aqueous baths containing decreasing concentrations of dimethylacetamide. (4%, 1% and less than 1% respectively). The third extraction bath also contained 0.1 wt. % sodium metaborate, 0.1 wt. % disodium ethylene diamine tetra-acetic acid, and 18 wt. % glycerine. The membrane was annealed in water for 7½ minutes at 45° C., 7½ minutes at 65° C. and 5.0 minutes at 85° C. Pieces of membrane were tested in a membrane test cell at 420 psig ($29 \times 10^5$ Pa). The results are reported in Table I.

TABLE I

| Elapsed Time Hours | Test Temp °C. | Feed Salt Conc. g/l | Flux Constant m/s*TPa | Rejection % |
|---|---|---|---|---|
| .16 | 26.60 | 2.01 | 4.69 | 97.12 |
| .50 | 26.60 | 2.01 | 4.77 | 97.47 |
| 1.00 | 26.60 | 2.01 | 4.92 | 97.53 |
| 2.00 | 26.60 | 2.01 | 5.17 | 97.65 |
| 5.00 | 26.10 | 1.99 | 5.22 | 97.51 |
| 21.00 | 25.40 | 2.02 | 5.18 | 97.64 |
| 29.00 | 25.80 | 2.23 | 4.92 | 97.37 |
| 45.00 | 25.60 | 2.05 | 5.12 | 97.59 |
| 53.00 | 26.20 | 1.94 | 4.96 | 97.61 |
| 118.00 | 25.00 | 1.95 | 4.86 | 97.66 |
| 125.00 | 25.90 | 1.92 | 4.91 | 97.51 |
| 143.00 | 25.60 | 1.97 | 4.87 | 97.75 |
| 166.00 | 25.60 | 1.97 | 4.80 | 97.64 |
| 173.00 | 26.40 | 1.94 | 4.93 | 97.70 |
| 190.00 | 25.80 | 1.96 | 4.92 | 97.66 |
| 197.00 | 26.40 | 1.94 | 4.78 | 97.85 |
| 214.00 | 26.00 | 1.95 | 4.75 | 97.83 |
| 221.00 | 26.90 | 1.92 | 4.58 | 97.78 |
| 286.00 | 25.50 | 1.97 | 4.74 | 97.61 |
| 293.00 | 26.00 | 1.95 | 4.61 | 97.79 |
| 310.00 | 26.00 | 2.03 | 4.62 | 97.71 |

From the results reported in Table I the membrane stability is calculated as follows. Kw (1) is 5.22 m/s.TPa, kw (3 yr.) is 4.45 m/s.TPa). The flux decline slope, fd, is −0.016 and MFRC$_3$ is 85.3%.

EXAMPLES 2-5

A primary membrane was prepared by coating a solution consisting of 17.6 wt. % of a polyaramide derived from isophthalyl chloride and terephthalyl chloride (in a mole ratio of 70/30) and m-phenylene diamine and m-phenylenediamine-4-sulfonic acid (in a mole ratio of 72/28) and 50.2 wt. % (based on polyamide) LiNO$_3$ in dimethylacetamide with a viscosity of 166 poise onto scoured and calendered sailcloth (Texlon ®0715) to a thickness of 7 mils ($1.78 \times 10^{-4}$ m). The polyaramide was dried for 2 minutes in a recirculating air drier at 244° F. (118° C.). Five seconds after removal from the dryer the polyaramide was gelled with a deluge of water containing about 5 wt. % dimethylacetamide at 20° C. The membrane was extracted for approximately 20 seconds, at 19° C., 43 seconds at 15° C. and 3 seconds at 20° C. respectively in three aqueous baths containing decreasing concentrations of dimethylacetamide (5%, 3% and less than 1% respectively). The third extraction bath also contained 0.25 wt. % sodium meta bisulfite, 0.25 wt. % magnesium chloride hexahydrate and 18 wt. % glycerine. The membrane was cut up into pieces which were annealed and tested as reported in Table II. The kw (3 yr.) results reported are calculated as described above.

TABLE II

| | Annealing | | 250 psig | | | 420 psig | | |
| --- | --- | --- | --- | --- | --- | --- | --- | --- |
| Example | Time Min | Temp °C. | kw (1) m/s·TPa | Rej % | MFRC$_3$ % | kw (3 yr.) m/s·TPa | kw (1) m/s·TPa | Rej % | MFRC$_3$ % | kw (3 yr.) m/s·TPa |
| 2 | 2/2/2 | 40/55/70 | 7.7 | 94.9 | 89 | 6.8 | | | | |
| 3 | 5/5/5 | 40/55/70 | 6.2 | 95.8 | 96 | 6.0 | 6.1 | 97.9 | 69 | 4.2 |
| 4 | 5/5/5 | 44/62/80 | 5.0 | 97.8 | 100 | 5.0 | 4.5 | 99.0 | 99 | 4.5 |
| 5 | 5/5/5 | 45/65/85 | 4.3 | 98.4 | 100 | 4.3 | 3.2 | 99.1 | 100 | 3.2 |

We claim:

1. A process for preparing a reverse osmosis membrane comprising casting a solution comprising 10 to 30 wt. % an aromatic polyamide and 30 to 60 wt. % based on aromatic polyamide of a modifying salt in a polar organic solvent to form a layer from 1 to 10 mils in thickness, evaporating solvent from said layer, quenching said layer with an aqueous medium to gel the aromatic polyamide, and annealing the gelled aromatic polyamide in water in a plurality of stages at from 40° to 110° C. with each successive stage being at a higher temperature than the previous stage, wherein the final stage is above 60° C. and lasts from 5 seconds to twenty minutes.

2. The process of claim 1 wherein the aromatic polyamide is essentially derived from metaphenylenediamine, metaphenylenediamine-4-sulfonic acid, isophthalyl chloride and terephthalyl chloride wherein the ratio of isophthalyl chloride to terephthalyl chloride is from 50:50 to 80:20 and the sulfur content of the polymer is from 0 to 4.5 weight percent.

3. The process of claim 2 wherein the solvent is at least 80 weight percent dimethyl acetamide.

4. The process of claim 3 wherein the modifying salt consists essentially of lithium nitrate, lithium chloride, magnesium chloride or mixtures thereof and is present in an amount of from 20 to 60 weight percent based on aromatic polyamide.

5. The process of claim 4 wherein there are two or three annealing steps.

6. The process of claim 5 wherein the annealing steps are carried out at 40° to 90° C.

7. The process of claim 6 wherein the aromatic polyamide contains from 1.5 to 3.8 weight percent sulfur.

8. The process of claim 7 wherein the final annealing step is carried out at 68° to 85° C.

9. The process of claim 8 wherein the casting solution contains from 10 to 30 percent by weight aromatic polyamide.

10. The process of claim 9 wherein the solution is cast onto a woven polyester or polyamide fabric.

11. A reverse osmosis membrane made by the process of claim 1.

* * * * *